(12) United States Patent
Schmidt et al.

(10) Patent No.: US 6,846,170 B2
(45) Date of Patent: Jan. 25, 2005

(54) INJECTION MOLDING MACHINE WITH AT LEAST ONE COLUMN HAVING A SURROUNDING JACKET

(75) Inventors: Bengt Schmidt, München (DE); Klaus Gessner, Dachau (DE); Thomas Hörl, Gröbenzell (DE); Friedirch Pipelka, Klosterneuburg (AT)

(73) Assignee: Krauss-Maffei Kunststofftechnik GmbH, München (DE)

( * ) Notice: Subject to any disclaimer, the term of this patent is extended or adjusted under 35 U.S.C. 154(b) by 204 days.

(21) Appl. No.: 10/340,874

(22) Filed: Jan. 9, 2003

(65) Prior Publication Data

US 2003/0152662 A1 Aug. 14, 2003

(30) Foreign Application Priority Data

Jan. 11, 2002 (DE) .......................................... 102 00 813

(51) Int. Cl.[7] .............................................. B29C 45/53
(52) U.S. Cl. .......................................... 425/225; 264/39
(58) Field of Search ................................ 425/151, 225, 425/210; 264/39

(56) References Cited

U.S. PATENT DOCUMENTS 3,728,057 A * 4/1973 Grundmann et al. ........ 425/151
5,269,673 A * 12/1993 Kempf et al. ................ 425/151
6,106,265 A * 8/2000 Von Holdt ................... 425/151
6,315,544 B1 * 11/2001 Burger et al. ................ 425/151

OTHER PUBLICATIONS

Wobbe et al.: "Verpackungen im Reinraum Spritzglessen/Packaging Injection Moulding under Clean–Room Conditions", in: Kunststoffe, Carl Hanser Verlag, München, Germany, May 1, 1996.

H. Eckhardt: "Clean–Room Injection Moulding", in: PE Plast Europe, Carl Hanser Verlag, München, Germany, Mar. 1, 1992.

D. Meyer: "Spritzgiessen im Reinraum", in: Kunststoffe, Carl Hanser Verlag, München, Germany, Nov. 1, 1992.

* cited by examiner

*Primary Examiner*—Tim Heitbrink
(74) *Attorney, Agent, or Firm*—Henry M. Feiereisen

(57) ABSTRACT

An injection molding machine includes a plasticizing unit and a closing unit which has at least one column which passes through and is moveable relative to a supporting element. A jacket at least partially surrounds the column at formation of an annular space and bears directly against the supporting element, wherein the jacket has at least one connection piece for providing a communication between the annular space and a suction unit.

20 Claims, 2 Drawing Sheets

INJECTION MOLDING MACHINE WITH AT LEAST ONE COLUMN HAVING A SURROUNDING JACKET

CROSS-REFERENCES TO RELATED APPLICATIONS

This application claims the priority of German Patent Application, Ser. No. 102 00 813.2, filed Jan. 11, 2002, pursuant to 35 U.S.C. 119(a)–(d), the disclosure of which is incorporated herein by reference.

BACKGROUND OF THE INVENTION

The present invention relates, in general, to an injection molding machine, and more particularly to an injection molding machine having a plasticizing unit and a closing unit of a type including at least one column completely traversing a supporting element and moveable relative thereto.

Injection molding machines, especially those for use under clean room conditions, are known to have modified sealing systems at the columns that move relative to the supporting element in order to decrease the release of contaminants. Examples of such sealing systems include seals made of Viton™ commercially available by DuPont Dow elastomers. The area stretching from the plasticizing unit to the mold mounting plate of injection molding machines, used under clean room conditions, are normally kept under a clean room environment having a lower class rating than the closing unit with the mold that are subject to a higher class rating. This difference in the class rating of the clean room environment is typically realized in practice by providing two separate spatial zones that are sealed from one another and include separate filtering systems. When maintenance work is required or the mold is to be replaced, the entire injection molding machine is moved into the area of lower class rating with respect to the clean room environment.

Still, contamination is encountered during operation as a result of abrasion caused by sliding friction as the column moves relative to the seal provided at the junction to the supporting element, and as a result of lubricant particles which evaporate from the lubricant film on the column. The relative movement between column and supporting element resembles a pump motion and promotes even more a spread of contaminations. Laboratory tests on closing units of an injection molding machine have shown that modified sealing systems, while decreasing the number of released contaminants at the point of penetration of the closing column into a fixed mold mounting plate, are still not sufficient to satisfy the more stringent demands on a clean room environment.

It would therefore be desirable and advantageous to provide an improved injection molding machine to obviate prior art shortcomings and to satisfy stringent clean room demands.

SUMMARY OF THE INVENTION

According to one aspect of the present invention, an injection molding machine includes a plasticizing unit, a closing unit having at least one column which passes through and is moveable relative to a supporting element, a suction unit, a jacket at least partially surrounding the column at formation of an annular space and bearing directly against the supporting element, wherein the jacket has at least one connection piece for providing a communication between the annular space and the suction unit.

The present invention resolves prior art problems by incorporating a suction unit to remove contaminants from the clean room environment. In this way, particles released into the environment as a result of the relative movement between column and supporting element at their juncture can be effectively reduced in a simple manner. This decrease in release of contaminants is especially relevant, when using the injection molding machine in a clean room environment that requires a higher class rating, and is in particular crucial between the closing columns and the mold mounting plate of an injection molding machine according to the invention, as each injection step is accompanied by a closing motion.

Decrease in release of contaminants can be realized by providing a jacket which at least partially surrounds the column on the side of the supporting element where the contaminants are released. The jacket has a configuration of a collar which directly adjoins the supporting element. The collar and the column define together an annular space which surrounds the column. The jacket is provided with at least one connection piece to fluidly connect the annular space with the suction unit, e.g., a pump, a vacuum cleaner, or a venturi nozzle. Attachment and operation of the suction unit produces a pressure below atmospheric in the annular space, and contaminants, such as abrasions, released on this side of the supporting element, and particles, evaporating from the lubricant film adhering to the column, are sucked off.

According to another feature of the present invention, the jacket can be constructed to be substantially air-tight. In this way, a sealed connection with the supporting element is implemented, while the annular space is in open communication with the environment, suitably on the supporting element distal side. The connection piece may be disposed on the supporting element confronting side of the jacket and connected to the suction unit. Suitably, the suction unit is located here in the area of lower clean room standards, i.e. in the area of the plasticizing unit. The connection between the suction unit and the connection piece can be realized by using tubes which are sealingly guided through a separation between the clean room environments of different class rating. During operation of the injection molding machine, the suction unit is switched on in order to aspirate particles, released at the juncture between the column and the supporting element, as well as lubricant particles emitted from the lubricant film that lines the column in the area of the column stroke and is exposed at this point of time.

As the annular space is not closed on the side distal to the supporting element and as the connection piece rests against the jacket area adjoining the supporting element, a particularly good flow of air is ensured through the annular space and an effective withdrawal of particulate contaminants is realized.

Of course, it may also be possible to position the connection piece approximately in mid-section of the jacket while the annular space, formed by the jacket and the column, remains open on the side that is distal to the supporting element. To still realize an effective flow through the annular space also in this configuration and to ensure a withdrawal of produced contaminants, the jacket is provided on the side of the supporting element with apertures, e.g., slots, through which air from the clean room can flow in.

According to another feature of the present invention, the annular space, formed by the jacket, can be sealed against the column on the supporting element distal side by a seal.

The provision of additional apertures enables aspiration of clean room air which, together with particulate contaminants, is removed via the connection piece provided in the area of the jacket. This configuration bears, however, a risk of contamination through abrasion as a result of the additional seal on the supporting element distal side that may partially be released into the clean room environment.

According to another aspect of the present invention, a jacket for an injection molding machine, includes two jacket portions of substantially semi-cylindrical configuration which are sealingly connected to one another and mounted adjacent the supporting element about the column, and at least one connection piece provided on at least one of the jacket portions for providing a fluid communication between the annular space and a suction unit. Suitably, the jacket portions can be connected by pipe clamps. Normally, the connection piece is configured as connection pipe.

Thus, existent injection molding machines can easily and rapidly equipped with a jacket according to the present invention.

According to another feature of the present invention, there may be provided rubber seals for sealing the substantially semi-cylindrical jacket portions relative to one another.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
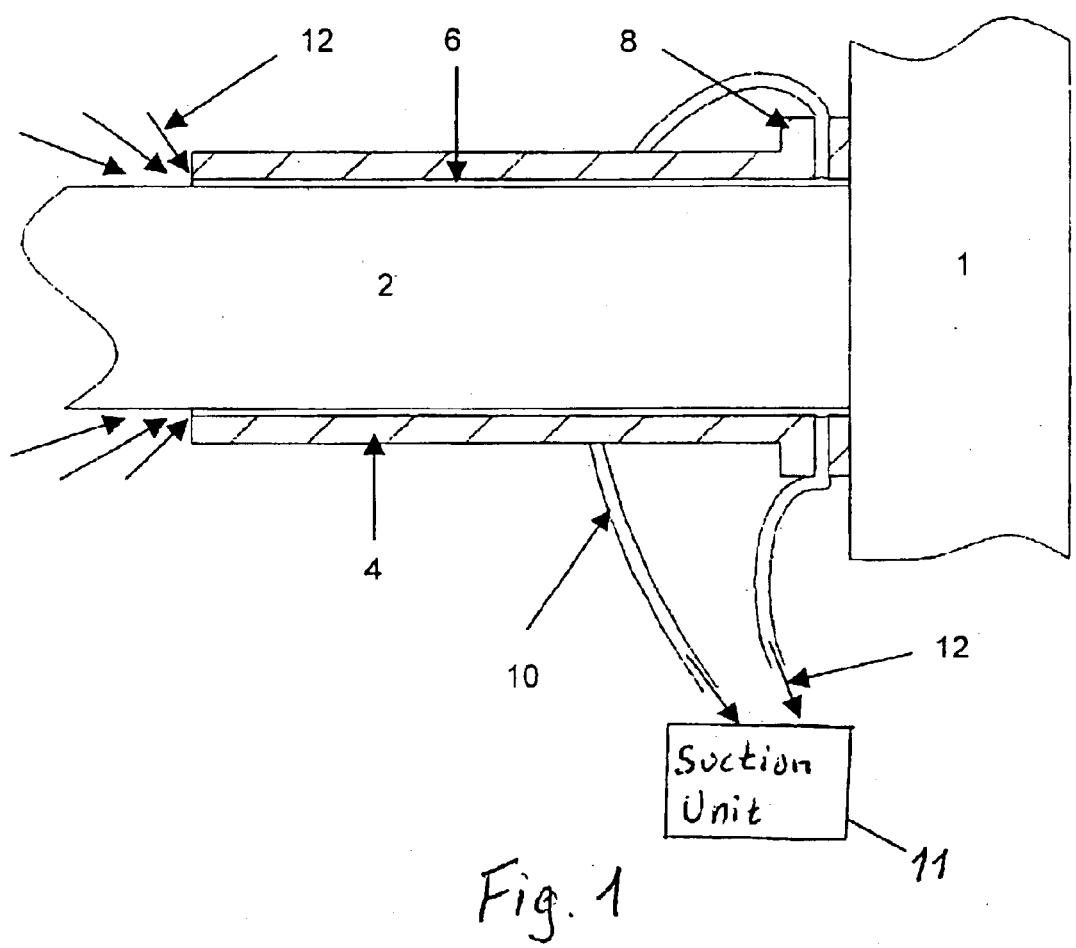
FIG. 1 shows a fragmentary, partially sectional view of a principal configuration of an injection molding machine according to the present invention.

Throughout all the Figures, same or corresponding elements are generally indicated by same reference numerals. The depicted embodiment is to be understood as illustrative of the invention and not as limiting in any way.

Turning now to FIG. 1, there is shown a fragmentary, partially sectional view of a principal configuration of an injection molding machine according to the present invention, including a supporting element, represented here by way of example by a mold mounting plate 1 which is traversed by a column or tie bar 2 of a closing unit. Only one column 2 of the closing unit is shown here by way of example in order to describe the principle of the present invention. It will also be appreciated by persons skilled in the art that the injection molding machine and the closing unit must contain much mechanical apparatus which does not appear in the foregoing Figures, e.g. further mold mounting plate, half-molds supported by the mold mounting plates, plasticizing unit, drive means etc.. However, this apparatus, like much other necessary apparatus, is not part of the invention, and has been omitted from the Figures for the sake of simplicity.

In the nonlimiting example of FIG. 1, the column 2 of the closing unit is movable while the mold mounting plate 1 is fixed. As soon as the column 2 moves during the return stroke out of the fixed mold mounting plate 1, the column 2 is lined by a fine lubricant coating which is caused by the lubrication of the sliding bearing in the fixed mold mounting plate 1 and cannot completely held back by seals of the sliding bearing.

To prevent a release of contaminants into the environment, in particular when the injection molding machine is used in a clean room environment, the column 2 is surrounded over its stroke range by a jacket 4 which envelopes the column 2 at a constant radial distance to define an annular space 6 with the column 2.

Figure 2:
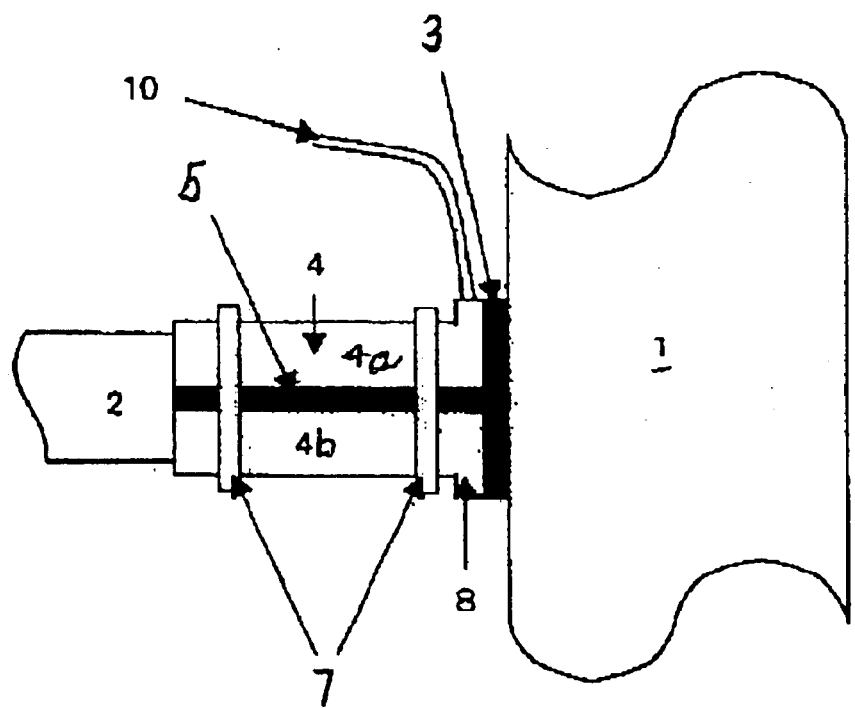
FIG. 2 is a more detailed fragmentary side view of the injection molding machine according to the present invention.

As shown in FIG. 2, the jacket 4 is sealed on its side adjacent the mold mounting plate 1 against the fixed mold mounting plate 1 by a sealing element 3 and is provided with two connection pieces 8 in the adjacent area to the mold mounting plate 1. Tubes 10 connect the connection pieces 8 with a suction unit 11 which generates a pressure below atmospheric in the annular space 6. Thus, a stream of air and particles is induced from the open (the left hand side in FIGS. 1 and 2) end of the jacket 4 to the connection pieces 8, as indicated by arrows 12. Contaminants, encountered as a result of the sliding friction between the column 2, on the one hand, and the fixed mold mounting plate 1 and the sealing element 3, on the other hand, are moved into the annular space 6. Likewise, particulate lubricants which evaporate from the lubricant film adhering to the column 2 are entrained by the stream and removed from the clean room zone.

Figure 3:
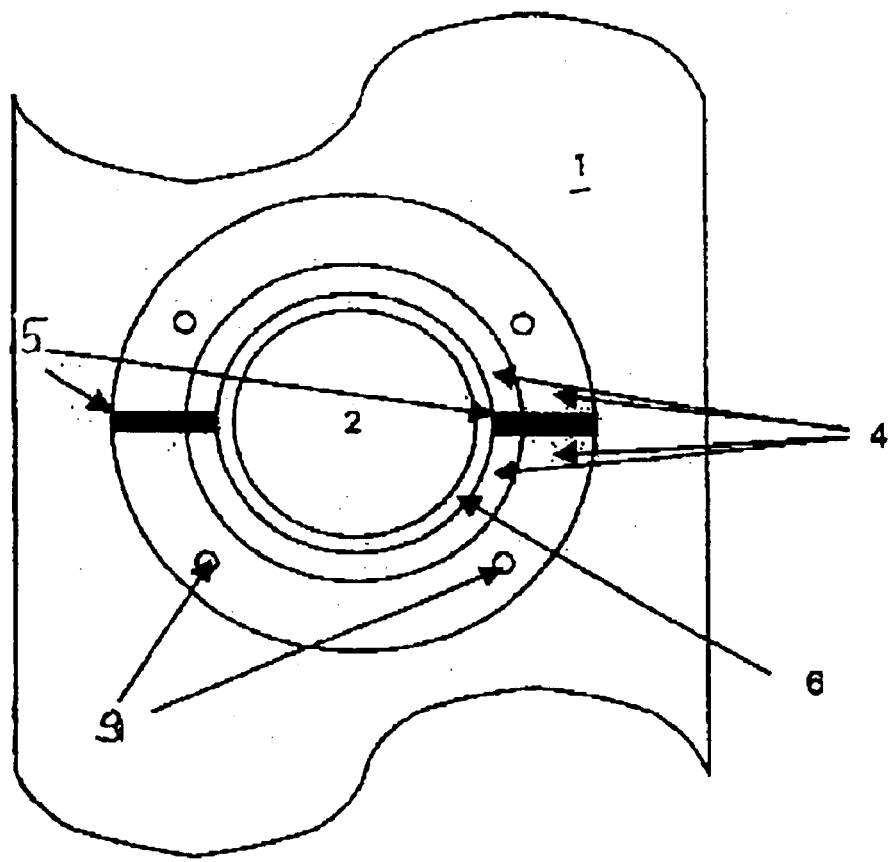
FIG. 3 is a plan view of the injection molding machine as viewed in the direction from a column toward a supporting element.

The jacket 4 according to the present invention is of simple design and thus can easily be mounted to existent constructions. Suitably, the jacket 4 is composed of two half-shells or semi-cylindrical jacket portions 4a, 4b which are connected together by suitable pipe clamps 7 and sealingly connected to one another by sealing elements 5, e.g., rubber seals, and sealingly connected to the fixed mold mounting plate 1 by the sealing element 3. As shown in particular in FIG. 3, fasteners 9 are provided to secure the half-shells 4a, 4b of the jacket 4 to the mold mounting pate 1.

Although the foregoing description is directed to a column 2 of a closing unit of an injection molding machine, the novel and inventive jacket 4 for surrounding a column, which is movable relative to a supporting element, is equally applicable for other such units which require clean room standards, e.g. in an ejection unit.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An injection molding machine; comprising:
   a plasticizing unit;
   a closing unit having at least one column which passes through and is moveable relative to a supporting element;
   a suction unit;

a jacket which at least partially surrounds the column at formation of an annular space and bears directly against the supporting element, wherein the jacket has at least one connection piece for providing a communication between the annular space and the suction unit.

2. The injection molding machine of claim 1, wherein the jacket is constructed so as to be substantially air-tight.

3. The injection molding machine of claim 1, wherein the annular space has at least one area in open communication with the environment.

4. The injection molding machine of claim 3, wherein the jacket has a distal end and a proximal end with respect to the supporting element, said at least one area of the annular space being provided at the distal end of the jacket.

5. The injection molding machine of claim 1, wherein the jacket is sealingly connected to the supporting element.

6. The injection molding machine of claim 1, wherein the at least one connection piece is disposed in an area of the jacket near the supporting element.

7. The injection molding machine of claim 1, wherein the jacket is composed of two substantially semi-cylindrical jacket portions which are sealed relative to one another.

8. The injection molding machine of claim 7, and further comprising rubber seals for sealing the jacket portions relative to one another.

9. The injection molding machine of claim 7, and further comprising pipe clamps for connecting the jacket portions to one another.

10. The injection molding machine of claim 1, wherein the supporting element is a fixed or moving mold mounting plate of the injection molding machine.

11. The injection molding machine of claim 1, wherein the column is a fixed or moving clamping column of the injection molding machine.

12. The injection molding machine of claim 1, wherein the at least one connection piece is constructed as connection pipe.

13. A jacket for an injection molding machine, comprising two jacket portions of substantially semi-cylindrical configuration which are sealingly connected to one another and are intended for surrounding an element of the injection molding machine at formation of an annular space; and a connection piece provided on at least one of the jacket portions for providing a communication between the annular space and a suction unit.

14. The jacket of claim 13, and further comprising fastening means for securing the jacket portions to a supporting element of the injection molding machine.

15. The jacket of claim 13, and further comprising rubber seals for sealing the substantially semi-cylindrical jacket portions relative to one another.

16. The jacket of claim 13, and further comprising pipe clamps for connection of the substantially semi-cylindrical jacket portions.

17. The jacket of claim 13, wherein the substantially semi-cylindrical jacket portions are each constructed so as to be substantially airtight.

18. The jacket of claim 14, and further comprising sealing means for sealing the substantially semi-cylindrical jacket portions relative to the supporting element.

19. The jacket of claim 14, wherein the connection piece is arranged on a side of the jacket portions on which also the fastening means are positioned.

20. The jacket of claim 14, wherein the connection piece is constructed as connection pipe.

* * * * *

UNITED STATES PATENT AND TRADEMARK OFFICE
CERTIFICATE OF CORRECTION

PATENT NO. : 6,846,170 B2
DATED : January 25, 2005
INVENTOR(S) : Bengt Schmidt et al.

It is certified that error appears in the above-identified patent and that said Letters Patent is hereby corrected as shown below:

<u>Title page,</u>
Item [75], Inventors, replace "Friedirch" with -- Friedrich --.

Signed and Sealed this

Seventh Day of June, 2005

JON W. DUDAS
*Director of the United States Patent and Trademark Office*